United States Patent
Stewart et al.

(10) Patent No.: US 7,677,617 B2
(45) Date of Patent: Mar. 16, 2010

(54) EFFICIENT JOINT FOR VEHICLE ENERGY-ABSORBING DEVICE

(75) Inventors: Bryan J. Stewart, New Hudson, MI (US); Raviraj U. Nayak, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/178,692

(22) Filed: Jul. 24, 2008

(65) Prior Publication Data

US 2010/0019518 A1    Jan. 28, 2010

(51) Int. Cl.
*B60R 19/34* (2006.01)

(52) U.S. Cl. .................................................... 293/133

(58) Field of Classification Search ............... 293/133, 293/132, 120; 296/187.05, 187.09, 187.03; 280/784; 188/377
See application file for complete search history.

(56) References Cited

U.S. PATENT DOCUMENTS

| | | | | |
|---|---|---|---|---|
| 4,272,114 A | * | 6/1981 | Hirano et al. ............... | 293/133 |
| 5,431,445 A | * | 7/1995 | Wheatley .................... | 280/784 |
| 5,876,078 A | * | 3/1999 | Miskech et al. ............. | 293/133 |
| 6,199,937 B1 | * | 3/2001 | Zetouna et al. ............. | 293/136 |
| 6,474,709 B2 | * | 11/2002 | Artner ........................ | 293/133 |
| 6,648,385 B2 | * | 11/2003 | Frank ......................... | 293/133 |
| 6,808,215 B2 | * | 10/2004 | Sakuma et al. ............. | 293/102 |
| 6,929,297 B2 | | 8/2005 | Muller et al. | |
| 7,044,515 B2 | | 5/2006 | Mooijman et al. | |
| 7,357,432 B2 | * | 4/2008 | Roll et al. ................... | 293/133 |
| 7,389,860 B2 | * | 6/2008 | Abu-Odeh et al. .......... | 188/377 |
| 2004/0084820 A1 | * | 5/2004 | Kato et al. .................. | 267/141 |
| 2006/0237976 A1 | * | 10/2006 | Glasgow et al. ............ | 293/132 |
| 2008/0106107 A1 | * | 5/2008 | Tan et al. .................... | 293/133 |

\* cited by examiner

*Primary Examiner*—Kiran B. Patel
(74) *Attorney, Agent, or Firm*—Quinn Law Group, PLLC.

(57) ABSTRACT

A vehicle having an energy-absorbing device mountable to a bumper of the vehicle is provided. The energy-absorbing device is attached to a vehicle rail having an inner rail surface and an edge surface. The energy-absorbing device defines a first crush surface interfacing with the inner rail surface. In a first embodiment, the energy-absorbing device defines a second crush surface positioned to directly interface with the edge surface of the vehicle rail in the event of an impact. The energy-absorbing device is configured to transmit load received from the impact directly to the edge surface of the vehicle rail through the second crush surface. This results in an efficient joint for the energy-absorbing device.

16 Claims, 2 Drawing Sheets

EFFICIENT JOINT FOR VEHICLE ENERGY-ABSORBING DEVICE

TECHNICAL FIELD

The invention relates in general to a vehicle with an energy-absorbing device mountable to a bumper of a vehicle.

BACKGROUND OF THE INVENTION

An energy-absorbing device, sometimes referred to as a crush box, is sometimes attached to a vehicle bumper so that in the event of a low-speed impact event, the energy-absorbing device deforms longitudinally, confining the damage to the energy-absorbing device. A low-speed impact event generally occurs at a velocity of approximately 10 miles per hour or less. In some designs, the energy-absorbing device transfers the load from an impact through a plate welded onto the end of the energy-absorbing device to a plate welded onto the end of the motor compartment rail. The presence of plates at the joint adds mass and takes up packaging space in the vehicle.

SUMMARY OF THE INVENTION

A vehicle having an energy-absorbing device mountable to a bumper of the vehicle is provided. The energy-absorbing device is attached to a vehicle rail having an inner rail surface and an edge surface. The energy-absorbing device defines a first crush surface interfacing with the inner rail surface. In a first embodiment, the energy-absorbing device defines a second crush surface configured to directly interface with the edge surface of the vehicle rail in the event of an impact. In the first embodiment, there is a gap between the second crush surface and the edge surface in the absence of an impact event. In a second embodiment, the second crush surface directly interfaces with the edge surface of the vehicle rail, both in the absence and presence of an impact event. The energy-absorbing device is configured to transmit load received from an impact directly to the edge surface of the vehicle rail through the second crush surface. This results in an efficient joint for the energy-absorbing device.

The energy-absorbing device may be configured to compress against the vehicle rail during the impact event. The vehicle rail may be configured to be stronger than the energy-absorbing device and resist the load, thereby causing the energy-absorbing device to deform. The energy-absorbing device and the vehicle rail may extend in a direction parallel to a forward travel direction of the vehicle. The vehicle rail may be formed from two metal sheets attached together or from a unitary metal sheet. Grooves may also be formed on the vehicle rail. The second crush surface may extend substantially about a perimeter of the energy-absorbing device.

The energy-absorbing device may include first, second and third portions. The second portion may be oriented approximately perpendicularly with respect to the first and the third portions. The third portion of the energy-absorbing device may abut the inner rail surface. The energy-absorbing device may include at least one indentation configured to aid in an efficient longitudinal crush. The indentations serve to weaken the crush can at the site of the indentations, to enable an accurate prediction of where the deformation will occur during an impact event.

A bulkhead may be placed inside a cavity defined by the energy-absorbing device. The bulkhead prevents the crush can from collapsing on itself during an impact event. The bulkhead may include a central portion and at least one tab extending from the central portion. The tab may be angled with respect to the central portion. The bulkhead may be sufficiently fitted into the cavity such that the tab is attached to an inner surface of the energy-absorbing device. Ribs may be formed on the central portion of the bulkhead. The bulkhead may include first and second tabs extending at respective angles from the central portion. The first and second tabs may be operatively connected to the energy-absorbing device and the vehicle rail at the first crush surface and the inner rail surface, respectively.

At least one bolt may operatively connect the vehicle rail, the energy-absorbing device and the first and second tabs of the bulkhead. A first reinforcement plate may be placed inside a cavity defined by the energy-absorbing device. The first reinforcement plate may include a middle section and at least one side section. The side section may be angled with respect to the middle section. The side section may be attached to the energy-absorbing device at the inner surface of the energy-absorbing device. A second reinforcement plate may be connected to the energy-absorbing device and placed inside the cavity of the energy-absorbing device.

Thus, an energy-absorbing device with an integrated design is provided, without requiring any plates or brackets welded onto the end of the vehicle rail. The load is directly applied to the end of the vehicle rail, creating an efficient load path for load transfer, while reducing mass, cost, components, and increasing packaging space. The configuration also provides increased local stiffness to the end of the vehicle rail in the cross car direction, i.e., transverse to the direction of forward travel. This has been shown to improve dynamic stiffness at the front cradle attachments.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1A:
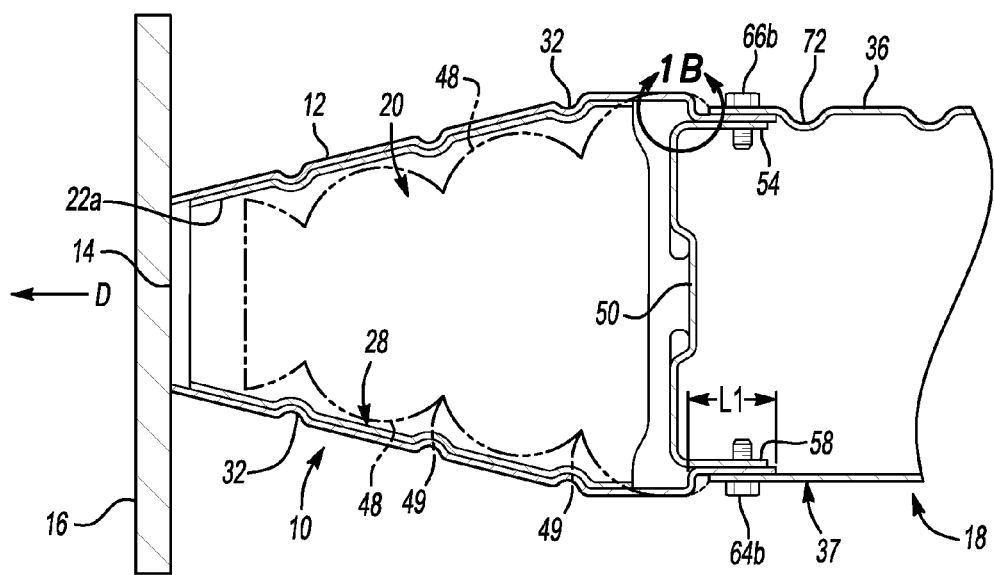
FIG. 1A is a schematic cross-sectional and fragmentary plan view of an energy-absorbing device taken at the lines 1A-1A in FIG. 4.
Figure 1B:
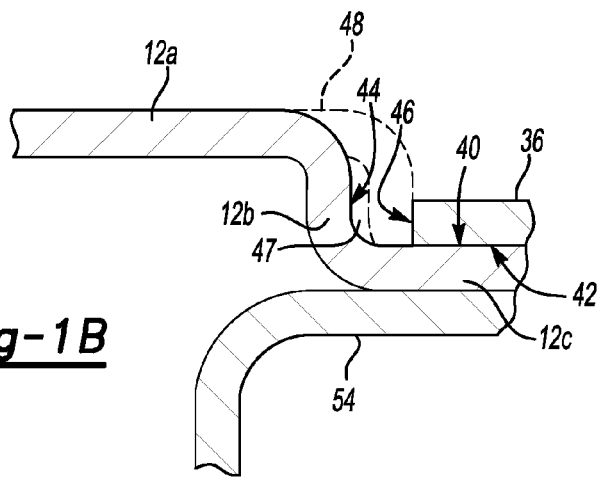
FIG. 1B is an enlarged view of the portion 1B of FIG. 1A, in accordance with a first embodiment.
Figure 2:
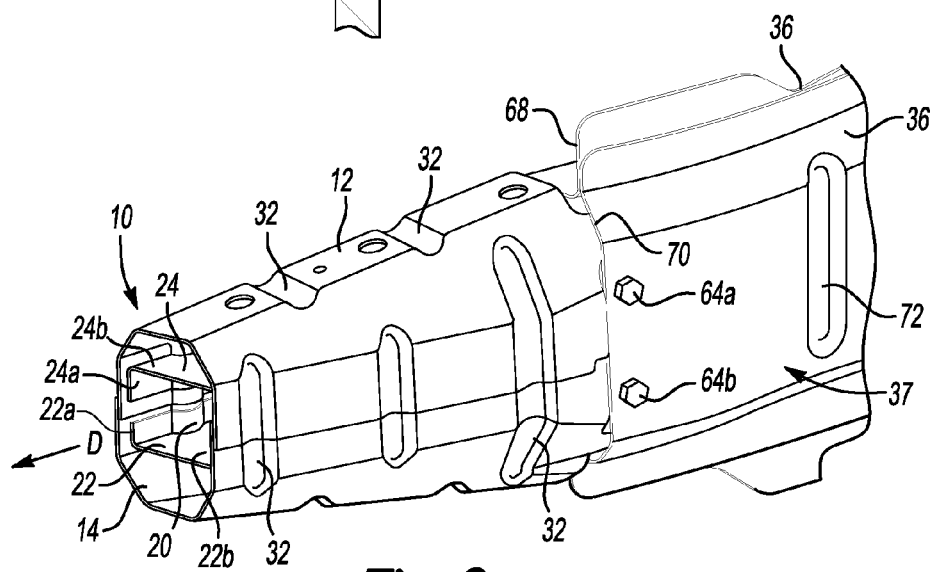
FIG. 2 is a schematic perspective fragmentary view of the energy-absorbing device shown in FIG. 1A.
Figure 3:
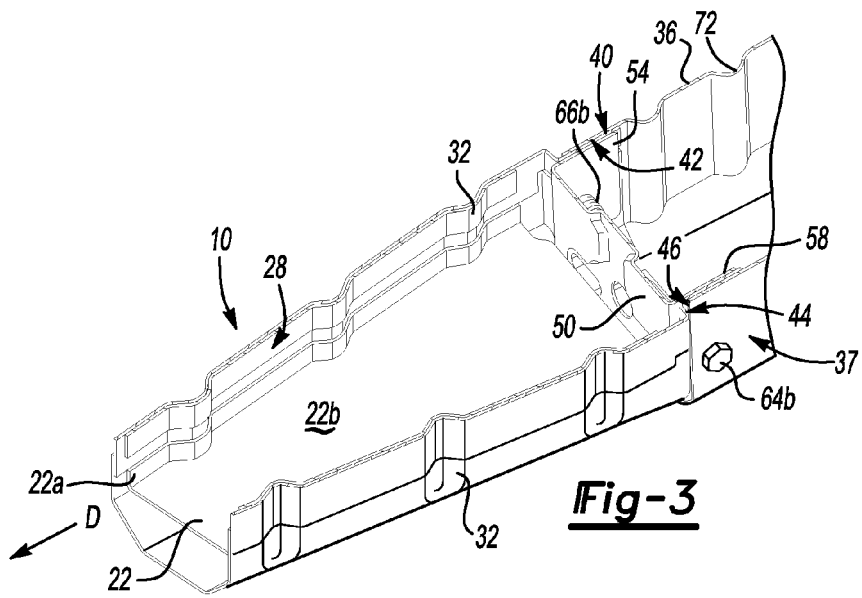
FIG. 3 is a schematic fragmentary perspective cross-sectional view of the energy-absorbing device shown in FIG. 2 taken at lines 3-3 in FIG. 4.
Figure 4:
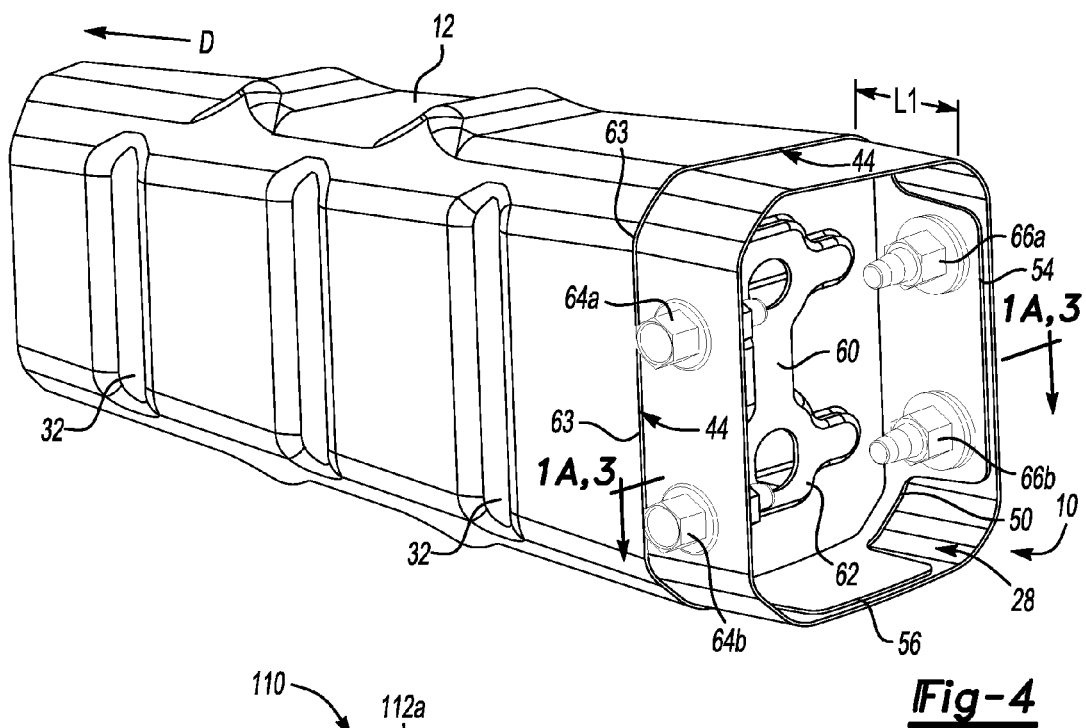
FIG. 4 is a schematic rear perspective view of the energy-absorbing device shown in FIG. 1A, showing a bulkhead placed in the energy-absorbing device and with the motor compartment rail removed.

FIG. 1A is a schematic plan cross-sectional view of an energy-absorbing device, referred to herein as a crush can 10. FIG. 1B is an enlarged view of the portion 1B of FIG. 1A. FIG. 2 is a schematic perspective fragmentary view of the crush can 10, while FIG. 3 is a schematic fragmentary perspective cross-sectional view of the crush can 10. FIG. 4 is a schematic rear perspective view of the energy-absorbing device shown in FIG. 1A The crush can 10 includes a body 12 defining an opening 14, shown in FIGS. 1A and 2. The body 12 is attached to a bumper 16 of a vehicle 18 at the opening 14, as shown in FIG. 1A. The forward travel direction D of the vehicle 18 is shown in FIGS. 1A, 2, 3 and 4. The body 12 of the crush can 10 extends in a direction substantially parallel to the forward travel direction D. The crush can 10 defines a cavity 20, shown in FIG. 1A.

A first reinforcement plate 22 is placed inside the cavity 20, as shown in FIGS. 2 and 3. A second reinforcement plate 24 may also be added. The reinforcement plates 22, 24 help to maintain a constant energy absorption rate through the body 12 of the crush can 10. As shown in FIGS. 2 and 3, the first and second reinforcement plates 22, 24 include side sections 22a, 24a, respectively, and middle sections 22b, 24b, respectively. The side sections 22a, 24a are oriented approximately perpendicularly with respect to the middle sections 22b, 24b of the reinforcement plates 22, 24, respectively. The side section 22a of the first reinforcement plate 22 is welded or mechanically attached to the inner surface 28 of the body 12 of the crush can 10, as best shown in FIG. 3. The side section 24a of the second reinforcement plate 24 is also similarly attached to the inner surface 28 of the crush can 10. The reinforcement plates 22, 24 may be composed of a metal or any other suitable material. The configuration of the first and second reinforcement plates 22, 24 may be varied in any suitable manner.

The crush can 10 also includes one or more indentations 32 (shown in FIGS. 1A, 2, 3 and 4) across the body 12 to enable the crush can 10 to more efficiently absorb energy and deform or crush. The indentations 32 serve to weaken the crush can 10 at the site of the indentations 32. This enables an accurate prediction of where the deformation will occur during an impact event.

The crush can 10 is attached to a vehicle rail, such as the motor compartment rail 36 shown in FIGS. 1A, 2 and 3. The end of the motor compartment rail 36 may be attached to the dash panel (not shown) of the vehicle 18. The motor compartment rail 36 extends in a direction parallel to the forward travel direction D. The outer surface 37 of the motor compartment rail 36 is also shown in FIGS. 1A, 2 and 3.

As noted above, FIG. 1B is an enlarged view of the portion 1B of FIG. 1A. The crush can 10 includes first, second and third portions 12a, 12b and 12c, respectively, shown in FIG. 1B. The second portion 12b juts inward and is oriented approximately perpendicularly with respect to the first and third portions, 12a, 12c, respectively. The third portion 12c of the crush can 10 is at least partially nested in and abuts the motor compartment rail 36.

As shown in FIG. 1B, a first crush surface 40 of the crush can 10 interfaces directly with the inner rail surface 42 of the motor compartment rail 36. That is, the crush surface 40 is in direct contact with the inner rail surface 42. In a first embodiment, a second crush surface 44 of the crush can 10 is positioned to interface directly with the edge surface 46 of the motor compartment rail 36 in the event of an impact, as shown in FIG. 1B. In the first embodiment, there is a gap 47 between the second crush surface 44 and the edge surface 46 of the motor compartment rail 36 in the absence of an impact event, as shown in FIG. 1B.

The crush can 10 is configured to transmit load received from the impact event directly to the edge surface 46 of the motor compartment rail 36 through the second crush surface 44, causing the crush can 10 to deform. The deformed profile 48 (in phantom) in FIG. 1A shows the deformation of the crush can 10 in the event of a low-speed impact event. As noted above, a low-speed impact event generally occurs at a velocity of approximately 10 miles per hour or less. This is one possible configuration for the deformation, however not all crush cans may deform in this manner. The dimples 49 (shown in FIG. 1A) in the deformed profile 48 correspond to the indentations 32 in the crush can 10. As noted above, the indentations 32 serve to weaken the crush can 10 at the site of the indentations 32, resulting in deformations at the site of the indentations 32. FIG. 1B shows the deformed profile 48 of the crush can 10 at the second crush surface 44, as it deforms and interfaces with the edge surface 46 of the motor compartment rail 36 during an impact event. The motor compartment rail 36 does not generally deform in a low speed impact event, however it may deform in a high speed impact event.

FIG. 4 is a schematic rear perspective view of the crush can 10, showing a bulkhead 50 (also shown in FIGS. 1A and 3) placed inside the cavity 20 of the crush can 10. The motor compartment rail 36 is not shown in FIG. 4 for clarity. The bulkhead 50 prevents the crush can 10 from collapsing on itself during an impact event. The bulkhead 50 includes a plurality of tabs arranged symmetrically around a central portion 60, shown in FIG. 4. First and third tabs 54, 56 are shown in FIG. 4. A second tab 58 is across from the first tab 54, as shown in FIGS. 1A and 3. A fourth tab (hidden from view in FIG. 4) is formed across from the third tab 56.

The first, second and third tabs 54, 58, 56 are angled with respect to the central portion 60. Alternatively, the tabs may be oriented approximately perpendicularly with respect to the central portion 60. The bulkhead 50 is fitted into the cavity 20 such that the first, second and third tabs 54, 58, 56 (as well as the fourth tab) may be welded or mechanically attached to the inner surface 28 (shown in FIGS. 1A, 3 and 4) of the body 12 of the crush can 10. The central portion 60 may be formed with ribs 62 for sturdiness of the bulkhead 50. The bulkhead 50 may be composed of a metal or any other suitable material. The configuration of the bulkhead 50 and the tabs may be varied in any suitable manner.

FIG. 4 shows the second crush surface 44 formed as a raised area of the body 12, extending throughout the perimeter 63 of the body 12 of the crush can 10. Alternatively, the second crush surface 44 may be formed as a raised area only at certain portions of the perimeter 63. The length L1 of the crush can 10 is nested in the motor compartment rail 36, shown in FIGS. 1A and 4. As noted above, the motor compartment rail 36 is not shown in FIG. 4 for clarity.

Bolts may be used to attach the motor compartment rail 36 to the crush can 10 and the bulkhead 50. Any other suitable methods of connecting the motor compartment rail 36, the crush can 10 and the bulkhead 50 may be used, e.g., adhesive, rivets or other mechanical fasteners. FIG. 4 shows bolts 64a, 64b on one side of the motor compartment rail 36 and bolts 66a, 66b on the other side. As shown in FIG. 1A, bolt 66b goes through the motor compartment rail 36, the crush can 10 (at the first crush surface 40) and the first tab 54. As shown in FIG. 1A, bolt 64b goes through the motor compartment rail 36, crush can 10 (at the first crush surface 40) and the second tab 58. Bolts 64a and 64b are also shown in FIG. 2, while bolt 64b, 66b are also shown in FIG. 3.

The energy-absorbing device 10 may be composed of a metal such as steel or aluminum or any other suitable material. The motor compartment rail 36 may include two metal sheets 68, 70 (shown in FIG. 2) that are welded or mechanically attached through any suitable method. Any other suitable configuration for the motor compartment rail 36 may be used. For example, the motor compartment rail 36 may be composed of one unitary piece of sheet metal with no welding, formed by hydroforming or other suitable methods. The motor compartment rail 36 may also be formed with grooves 72, shown in FIGS. 1A and 2). The grooves 72 serve to initiate deformation in high speed impact events, i.e., they weaken the motor compartment rail 36 at the site of the grooves 72 in high speed impact events. The motor compartment rail 36 may be composed of a metal composite, aluminum, steel or any other suitable material. The configuration of the motor compartment rail 36 may be varied in any suitable manner.

In the event of an impact, the crush can 10 absorbs the energy of the impact event. The load is transferred through the body 12 of the energy-absorbing device or crush can 10 and directly applied to the motor compartment rail 36, through the first and second crush surfaces 40, 44. Most of the impact load is transferred through the second crush surface 44 to the edge surface 46 of the motor compartment rail 36. There are no intermediate plates between the surfaces 44, 46, creating an efficient load path. Without intermediate plates, the overall mass of the crush can 10 is reduced and the crush can requires less packaging space.

The crush can 10 uses the motor compartment rail 36 to initiate its crush, i.e., when the crush can 10 is compressed against the motor compartment rail 36, the motor compartment rail 36 resists the energy and causes the crush can 10 to deform longitudinally. The motor compartment rail 36 is designed to be stronger than the crush can 10. Through the use of different materials and/or changes in thicknesses (gauge), the motor compartment rail 36 may be configured to be stronger than the crush can 10. For example, the motor compartment rail 36 may be made using steel of a higher grade than the crush can 10. Alternatively, thicker sheet metals may be used to form the motor compartment rail 36, compared to the crush can 10. Making the motor compartment rail 36 stronger than the crush can 10 may be achieved in many other ways as well, e.g., variations in the shape of the motor compartment rail 36 with respect to the crush can 10, the use of additional reinforcements, and other methods.

Second Embodiment

Figure 5:
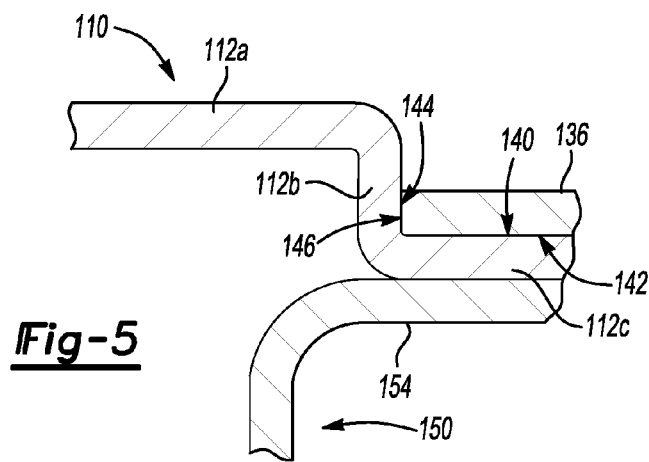
FIG. 5 shows the same view as FIG. 1B, in accordance with a second embodiment.

A second embodiment is shown in FIG. 5, with a crush can 110. FIG. 5 shows the same view as FIG. 1B, which is an enlarged view of the portion 1B of FIG. 1A. In the second embodiment, a second crush surface 144 directly contacts an edge surface 146 of the motor compartment rail 136 with no gap therebetween. In the second embodiment, the profile of the crush can 110 would remain the same at the second crush surface 144 in the event of an impact, since the second crush surface 144 is already in direct contact with the edge surface 146 of the motor compartment rail 136. Thus the second crush surface 144 directly interfaces with the edge surface 146, both in the absence and presence of an impact event. The crush can 110 is configured to transmit load received from the impact directly to the edge surface 146 of the motor compartment rail 136 through the second crush surface 144. This results in an efficient joint for the crush can 110.

The first crush surface 140 of the crush can 110 continues to interface directly with the inner rail surface 142 of the motor compartment rail 136. FIG. 5 shows the first, second and third portions 112a, 112b and 112c, respectively, of the crush can 110. Similar to FIG. 1B, FIG. 5 also shows a tab 154 of a bulkhead 150 (partially shown) that is placed in a cavity defined by the crush can 110.

While the best modes for carrying out the invention have been described in detail, those familiar with the art to which this invention relates will recognize various alternative designs and embodiments for practicing the invention within the scope of the appended claims.

The invention claimed is:

1. A vehicle having a bumper comprising:
    at least one energy-absorbing device attached to the bumper;
    a vehicle rail having an inner rail surface and an edge surface, said at least one energy-absorbing device being attached to said vehicle rail;
    said at least one energy-absorbing device defining a first crush surface interfacing with said inner rail surface;
    said energy-absorbing device defining a second crush surface configured to directly interface with said edge surface in the event of an impact; and
    wherein said energy-absorbing device is configured to transmit load from said impact directly to said edge surface of said vehicle rail through said second crush surface.

2. The vehicle of claim 1, wherein said second crush surface is configured to directly interface with said edge surface in the absence of said impact.

3. The vehicle of claim 1, wherein:
    said energy-absorbing device is configured to compress against said vehicle rail during said impact event; and
    wherein said vehicle rail is configured to be stronger than said energy-absorbing device and resist said load; thereby causing said energy-absorbing device to deform.

4. The vehicle of claim 1, wherein said energy-absorbing device and said vehicle rail extend in a direction parallel to a forward travel direction of said vehicle.

5. The vehicle of claim 1, further comprising grooves formed on said vehicle rail; and wherein said vehicle rail is formed from two metal sheets attached together.

6. The vehicle of claim 1, wherein said second crush surface extends substantially about a perimeter of said energy-absorbing device.

7. The vehicle of claim 1, wherein said energy-absorbing device includes at least one indentation configured to weaken said energy-absorbing device at said indentation.

8. The vehicle of claim 1, wherein:
    said energy-absorbing device includes first, second and third portions;
    wherein said second portion is oriented approximately perpendicularly with respect to said first and said third portions; and
    wherein said third portion of the said energy-absorbing device abuts said inner rail surface.

9. The vehicle of claim 8, further comprising:
    a first reinforcement plate placed inside a cavity defined by said energy-absorbing device, said first reinforcement plate including a middle section and at least one side section;
    wherein said side section is angled with respect to said middle section; and
    wherein said side section is attached to said energy-absorbing device at an inner surface of said energy-absorbing device.

10. The vehicle of claim 9, further comprising a second reinforcement plate connected to said energy-absorbing device placed inside said cavity of said energy-absorbing device.

11. The vehicle of claim 1, further comprising:
    a bulkhead placed inside a cavity defined by said energy-absorbing device; said bulkhead including a central portion and at least one tab extending from said central portion;

wherein said at least one tab is angled with respect to said central portion; and wherein said bulkhead is sufficiently fitted into said cavity such that said at least one tab is attached to an inner surface of said energy-absorbing device.

12. The vehicle of claim 11, further comprising ribs formed on said central portion of said bulkhead.

13. The vehicle of claim 11, wherein said at least one tab includes:

first and second tabs extending at respective angles from said central portion; and wherein said first and second tabs are operatively connected to said energy-absorbing device and said vehicle rail at said first crush surface and said inner rail surface, respectively.

14. The vehicle of claim 13, further comprising at least one bolt to operatively connect said vehicle rail, said energy-absorbing device and said first and second tabs of said bulkhead.

15. The vehicle of claim 1, wherein said energy-absorbing device is a crush can.

16. The vehicle of claim 8, wherein said energy-absorbing device is a crush can.

* * * * *